US009622215B2

(12) United States Patent
Zhang et al.

(10) Patent No.: US 9,622,215 B2
(45) Date of Patent: Apr. 11, 2017

(54) OPTIMIZED MECHANISM FOR PAGING TRANSMISSION AND RECEPTION

(71) Applicant: MEDIATEK Singapore Pte. Ltd., Singapore (SG)

(72) Inventors: Yuanyuan Zhang, Beijing (CN); Yu-Syuan Jheng, Taipei (TW); Feifei Sun, Beijing (CN); Li Chen, Beijing (CN); I-Kang Fu, Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/918,773

(22) Filed: Oct. 21, 2015

(65) Prior Publication Data

US 2016/0044633 A1 Feb. 11, 2016

Related U.S. Application Data

(63) Continuation of application No. PCT/CN2015/078557, filed on May 8, 2015.

(30) Foreign Application Priority Data

May 9, 2014 (CN) .......................... 2014 1 0195278

(51) Int. Cl.
*H04W 68/00* (2009.01)
*H04W 68/02* (2009.01)
(Continued)

(52) U.S. Cl.
CPC ............. *H04W 68/02* (2013.01); *H04W 4/06* (2013.01); *H04W 76/046* (2013.01)

(58) Field of Classification Search
CPC ...... H04W 68/02; H04W 76/046; H04W 4/06
(Continued)

(56) References Cited

U.S. PATENT DOCUMENTS 6,058,308 A * 5/2000 Kallin ................... H04W 68/08
455/432.3
6,477,382 B1 * 11/2002 Mansfield ............. H04W 68/00
370/311
(Continued)

FOREIGN PATENT DOCUMENTS

WO WO2011000441 A1 7/2009
WO WO2011025788 A1 8/2009
(Continued)

OTHER PUBLICATIONS

International Search Report and Written Opinion of International Search Authority for PCT/CN2015/078557/ dated Jun. 29, 2015 (15 pages).

*Primary Examiner* — Babar Sarwar
(74) *Attorney, Agent, or Firm* — Imperium Patent Works; Helen Mao; Zheng Jin

(57) ABSTRACT

Methods and apparatus are provided for paging transmission and reception for UEs requiring coverage extension/coverage enhancement. In one novel aspect, the UE reports the CE status to the MME. CE level related information and the corresponding cell ID are provided from eNB to MME. MME sends paging information including the repetition number to all eNBs in the corresponding tracking area when paging the UE. In another novel aspect, a paging area is used for CE UEs. The UE receives paging area information, notifies the network, and updates the stored paging area information upon detecting changes between the received and the stored paging areas. In another embodiment, the UE reports its CE status upon detecting CE status changes. The eNB stores UE CE information and forwards it to neighboring eNBs in the same paging area. The eNB pages UEs on its CE UE list with repetition while paging other UEs normally.

24 Claims, 10 Drawing Sheets

(51) Int. Cl.
*H04W 4/06* (2009.01)
*H04W 76/04* (2009.01)

(58) Field of Classification Search
USPC ....... 455/515–517, 458, 426.1, 412.1–414.2,
455/418–422.1, 432.1, 434, 437, 439,
455/442, 444, 450, 552.1, 452.1, 453, 4,
455/56.1, 456.3, 457; 370/328–332, 338,
370/311, 312, 322, 343, 341
See application file for complete search history.

(56) References Cited

U.S. PATENT DOCUMENTS

| | | | | | |
|---|---|---|---|---|---|
| 6,745,039 | B1* | 6/2004 | Di Lalla | ............... | H04W 68/04 455/422.1 |
| 7,047,050 | B1* | 5/2006 | Khawand | ............... | H04L 1/20 455/574 |
| 7,937,096 | B2* | 5/2011 | Funato | ............... | H04W 24/02 455/432.1 |
| 8,204,517 | B1* | 6/2012 | Rai | ............... | H04W 68/02 455/422.1 |
| 2003/0225887 | A1* | 12/2003 | Purnadi | ............... | H04L 69/168 709/227 |
| 2004/0254980 | A1* | 12/2004 | Motegi | ............... | H04W 68/00 709/203 |
| 2006/0094450 | A1* | 5/2006 | Park | ............... | H04W 52/0225 455/458 |
| 2007/0281686 | A1* | 12/2007 | Liu | ............... | H04W 8/20 455/433 |
| 2010/0081454 | A1* | 4/2010 | Wang | ............... | H04W 68/02 455/456.1 |
| 2011/0205983 | A1 | 8/2011 | Bharadwaj et al. | ............... | 370/329 |
| 2012/0163319 | A1 | 6/2012 | Roessel et al. | ............... | 370/329 |
| 2013/0143563 | A1* | 6/2013 | Singh | ............... | H04W 68/02 455/436 |
| 2014/0098761 | A1* | 4/2014 | Lee | ............... | H04W 74/006 370/329 |
| 2016/0205659 | A1* | 7/2016 | Bergman | ............... | H04L 1/1812 370/252 |

FOREIGN PATENT DOCUMENTS

WO  WO2014055878 A1  10/2012
WO  WO2015026285 A2  8/2013

* cited by examiner

OPTIMIZED MECHANISM FOR PAGING TRANSMISSION AND RECEPTION

CROSS REFERENCE TO RELATED APPLICATIONS

This application is filed under 35 U.S.C. §111(a) and is based on and hereby claims priority under 35 U.S.C. §120 and §365(c) from International Application No. PCT/CN2015/078557, with an international filing date of May 8, 2015, which in turn claims priority from Chinese Application Number CN201410195278.9, filed on May 9, 2014. This application is a continuation of International Application No. PCT/CN2015/078557, which claims priority from Chinese Application No. CN201410195278.9. International Application No. PCT/CN2015/078557 is pending as of the filing date of this application, and the United States is a designated state in International Application No. PCT/CN2015/078557. This application claims the benefit under 35 U.S.C. §119 from Chinese Application No. CN201410195278.9. The disclosure of each of the foregoing documents is incorporated herein by reference.

TECHNICAL FIELD

The disclosed embodiments relate generally to wireless communication, and, more particularly, to optimized mechanism for paging transmission and reception.

BACKGROUND

Extending the reach of wireless communication is a challenge for all types of network, especially in the rural or remote areas. Due to the nature of the radio environment, services and power are difficult to deliver. It is both impractical and uneconomical to deliver coverage using a traditional base station approach. Taking LTE for example, it will be deployed at higher carrier frequencies than existing 2G and 3G systems, which implies higher propagation losses for LTE and potentially a need to add more sites to ensure sufficiently good coverage. Adding sites is costly and requires lengthy negotiations. Machine-to-Machine (M2M) applications required low-cost devices and improved coverage other than the current cellular communication system. For example, some smart metering deceives are often installed in the basements of residential buildings or locations shielded by foil-backed insulation, metalized windows, or traditional thick-walled building construction. These smart devices suffer a significantly larger path-loss, such as 20 dB path loss, than that in the typical operation condition of normal devices. In order to ensure the network provides the best possible solutions to maximize coverage and serves the specific devices, the 3rd generation partnership project (3GPP) RAN1 working group has studied for coverage improvement for devices requiring coverage extension/coverage enhancement (CE). Some potential solutions have been identified such as repetition of the physical channels to improve the coverage.

For network-originated data transfer to UEs requiring CE, some challenges are expected when they are in RRC_IDLE, which include the network does not know which cell the UE camps on, and whether the UE requires CE or not. Therefore, the network would not know whether to page the UE with CE through transmission repetitions. One possible solution is that on the network side, the MME assumes the UE does not require CE. The network pages the UE normally without requiring the knowledge of the UE CE status.

However, under this approach since there is no HARQ process for paging, the UE requiring CE normally cannot receive the paging message in one paging occasion, which means the UE is unreachable.

Improvement and enhancement are required to efficiently paging the UEs requiring CE in the wireless network.

SUMMARY

Methods and apparatus are provided for paging transmission and reception for UE requiring CE.

In one novel aspect, a paging area, which is a geographic area covered by a subset of cells of a tracking area, is used for CE UEs. In one embodiment, the paging area is identified by an identity (ID) or a neighboring cell list, which is acquired from the broadcast information. The UE receives the paging area information, and notifies the network of its presence and updates the stored paging area information upon detecting any changes between the received paging area and a stored paging area. In one embodiment, the UE establishes a RRC connection to indicate its presence. In another embodiment, the UE establishes a RRC connection with establishment cause indicating a "paging area change." In one embodiment, the UE receives the paging area information from the system information (SI). In another embodiment, the UE reports its CE status upon detecting changes of the CE status. In one embodiment, the UE reports its CE status periodically. In yet another embodiment, the UE reports its previously stored paging area information upon detecting changes of paging area information between the received paging area and the stored paging area.

In one novel aspect, the base station broadcasts its paging area information in the system information. The base station stores the UE information upon receiving presence indication from the UE requiring CE and forwards the information to neighboring base stations in the same paging area. The base station pages UE on the CE UE list with repetition and other UEs normally. In one embodiment, the base station releases the UE information from its CE UE list if one or more release triggering events are detected, including the UE is not successfully paged for a number of tries or for a period, being informed by another group of neighboring eNBs that the UE has moved out of the paging area.

In another novel aspect, the MME acquires CE status of a UE. The MME determines a paging repetition number if the paged UE is in CE mode. The MME notifies the one or more eNBs that the paging is for UEs of low cost or requiring CE. In one embodiment, the MME provides a repetition number to the base stations in the same tracking area such that the base stations send the paging messages repeatedly by the repetition number. In another embodiment, the MME receives CE related information from a base station. The CE related information includes the UE CE status and the corresponding cell ID.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
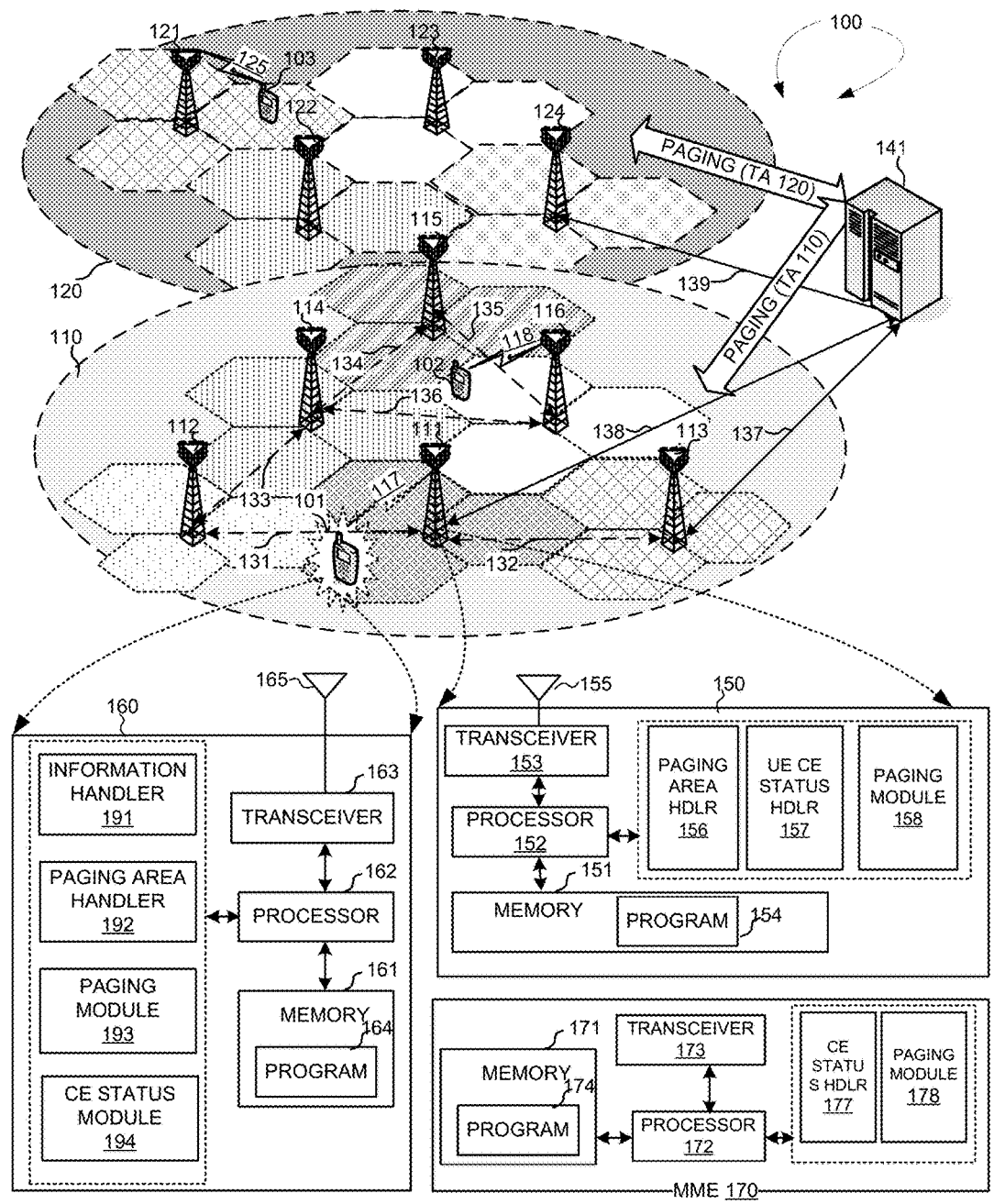
FIG. 1 illustrates an exemplary wireless communication network with UEs requiring CE in accordance with embodiments of the current invention.

FIG. 1 illustrates an exemplary wireless communication network 100 with UEs requiring CE in accordance with embodiments of the current invention. Wireless communication system 100 includes multiple fixed base infrastructure units, such as base stations 111-116 and base stations 121-124, forming a network distributed over a geographical region, each base station covers a geographical area. The base unit may also be referred to as an access point, an access terminal, a base station, a Node-B, an eNode-B, or by other terminology used in the art. The one or more base stations 111-116 and 121-124 serve a number of mobile stations 101, 102 and 103 within a serving area, for example, a cell, or within a cell sector. Backhaul connections, such as X2 interface 131-136 connect the non-co-located base stations, such as 111-116. These backhaul connections can be either ideal or non-ideal.

In one embodiment, mobile communication network 100 comprises a plurality of base stations eNBs and a plurality of mobile stations, such as mobile stations 101, 102 and 103. UE 101 resides in the coverage area of eNB 111 and communicates with eNB 111 through radio link 117. UE 101 requires CE. The data blocks over link 117 needs to be repeatedly transmitted so that UE 101 can receive the transmission correctly. Normal UEs 102 and 103 reside in the coverage areas of eNBs 116 and 121, respectively. UEs 102 and 103 communicate with eNBs 116 and 121 through radio links 118 and 125, respectively. When there is a downlink packet to be sent from the eNB to the mobile station, each mobile station gets a downlink assignment, e.g., a set of radio resources in a physical downlink shared channel (PDSCH). When a UE needs to send a packet to eNodeB in the uplink, the mobile station gets a grant from the eNodeB that assigns a physical downlink uplink shared channel (PUSCH) consisting of a set of uplink radio resources. The mobile station gets the downlink or uplink scheduling information from a physical downlink control channel (PDCCH) or an enhanced physical downlink control channel (EPDCCH) that is targeted specifically to that mobile station. The downlink or uplink scheduling information and the other control information, carried by PDCCH, is referred to as downlink control information (DCI).

A network entity, such as a mobility management entity (MME) 141 is connected with base stations such as eNB 111-116 and 121-124, via exemplary links such as 137-139. Though not shown the drawings, each eNB of wireless network 100 may have a link with MME 141. In wireless network 100, paging procedures are initiated by a network entity such as MME 141. One or more cells or eNBs form a tracking area. For example, a tracking area 110 is formed including eNBs 111 to 116 or cells served by eNBs 111 to 116. A tracking area 120 includes eNBs 121 to 124 or cells served by eNBs 121 to 124. While UEs are in the idle mode, the locations of UEs are known by MME, at the track area level. When the network needs to page a UE, the MME sends the paging message to all the eNBs in the tracking area where the UE resides. For example, MME 141 sends the paging message to all eNBs in tracking area 110 when it needs to page idle-mode UE 101 or idle-mode UE 102. Similarly, when paging idle-mode UE 103, MME 141 sends paging message to all eNBs in tracking area 120.

In one example, UE 101 requires CE, which means data blocks needs to be transmitted repeated so that UE 101 can receive them correctly. Therefore, paging message to idle-mode UE 101 needs to be repeatedly transmitted over different subframes by a repetition. In doing so, eNBs 111-116 all need to transmit the paging messages repeatedly by the repetition number. Large amount of data traffic in tracking area 110 is generated. In one novel aspect, paging areas formed, each consists of a subset of eNBs or cells of a tracking area. Each eNB keeps track of the UEs requiring CE in the paging area. eNBs in the same paging area exchanges CE UE information via the X2 interface. UEs requiring CE reports its CE status to the serving cell.

In one embodiment, the communication system utilizes RRC layer to control communications between a UE and an eNB at the radio interface and the mobility of a UE crossing cells. RRC layer performs system information broadcasting/reception, paging, RRC connection establishment/release, NAS information transfer, mobility control and so on. Exemplary of RRC layer includes the developing Long Term Evolution (LTE) of the 3GPP UMTS standard.

In another embodiment, the communication system utilizes NAS layer to control communications between a UE and MME. NAS layer performs EPS bearer management, authentication, ECM-IDLE mobility handling, paging origination in ECM-IDLE and security control. Exemplary of NAS layer includes the developing Long Term Evolution (LTE) of the 3GPP UMTS standard.

FIG. 1 further shows simplified block diagrams 160, 150 and 170 for mobile station 101, and base station 111 and MME 141, respectively, in accordance with the current invention.

The eNB 111 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 111. Memory 151 stores program instructions and data 154 to control the operations of eNB 111. eNB 111 also includes a set of control modules, such as a paging area handler 156, a UE CE status handler 157 and paging module 158, to carry out functional tasks and page mobile stations. Paging area handler 156 are functions and communicates with eNB and UE to implement the paging area methods. In another case, if the paging area is not formed, so the paging with repetition could be implemented, so in this case, the paging area handler 156 could be omitted, and paging module 158 could be used to page UE to implement the paging without paging area information, for example, the paging UE with repetition, or normally paging without repetition. UE CE status handler 157 performs tasks such the network entity can acquire CE status of UEs.

Mobile station 101 has an antenna 165, which transmits and receives radio signals. A RF transceiver module 163, coupled with the antenna, receives RF signals from antenna 165, converts them to baseband signals, and sends them to processor 162. RF transceiver 163 also converts received baseband signals from processor 162, converts them to RF signals, and sends out to antenna 165. Processor 162 processes the received baseband signals and invokes different functional modules to perform features in mobile station 101. Memory 161 stores program instructions and data 166 to control the operations of mobile station 101.

Mobile station 101 also includes a set of control modules that carry out functional tasks. An information handler 191 stores information of a paging, e.g. the paging message. The paging area is a subset of a tracking area for a paging message. A paging area handler 192 receives information of a paging area from a base station in a wireless network when the UE requires CE, determines if there is any change between the paging area and the stored paging area of the UE, and notifies the base station if there is any paging area change. A paging module 193 receives and processes paging messages in the paging area, wherein the page messages are transmitted repeatedly by a repetition number. In another embodiment, the paging area is not formed, so the paging area handler 192 could be omitted, and the paging module 193 receives and processes paging messages, wherein a repetition number transmits the paging messages repeatedly. A CE status handler 194 detects UE CE status and forwards the status to the network entity.

MME 141 has a transceiver module 173 that receives messages, and sends them to processor 172. Transceiver 173 also converts received signals from processor 172 and sends the signals to other entities. Processor 172 processes the received signals and invokes different functional modules to perform features in MME 141. Memory 171 stores program instructions and data 174 to control the operations of MME 141. MME 141 also includes control modules, such as CE status handler 177, to carry out the function and tasks for MME 141, and paging module 178 to carry out the function and tasks for paging the UE in the tracking area.

Figure 2:
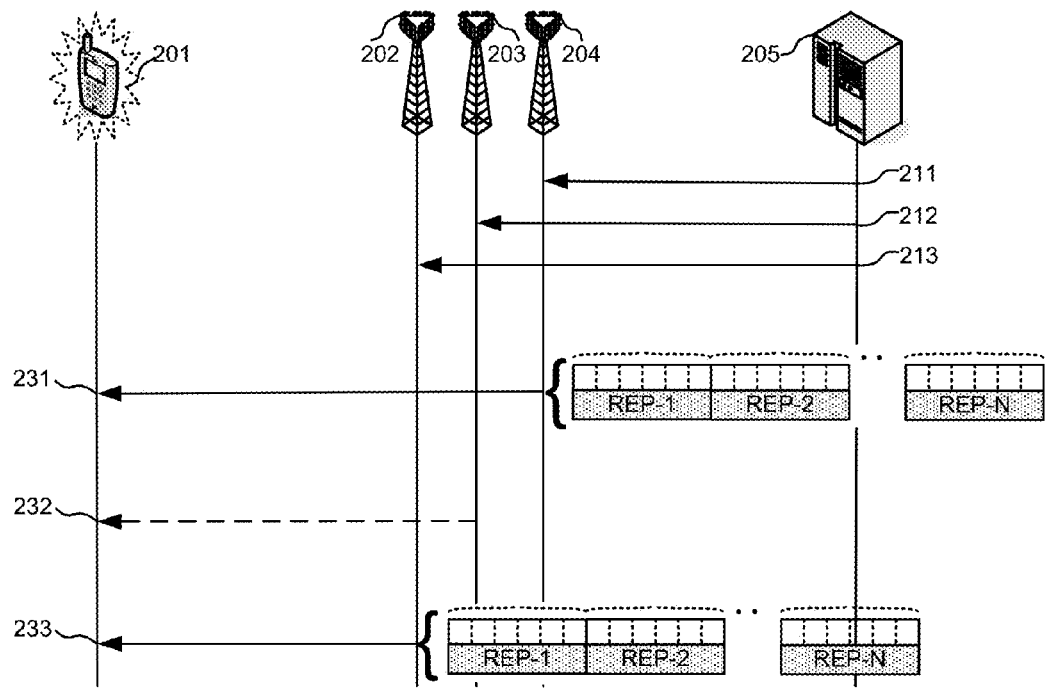
FIG. 2 illustrates an exemplary paging procedure between UE, eNB and MME for the paging procedure for the UE requiring CE in accordance with embodiments of the current invention.

FIG. 2 illustrates an exemplary paging procedure between UE, eNB, and MME for the paging procedure for the UE requiring CE in accordance with embodiments of the current invention. UE 201 requires CE. UE 201 in idle mode resides in the tracking area served by eNBs 202, 203, and 204, which are connected with a network entity, such as MME 205 via S1 interface. From the network side, if there is a terminating call towards a UE in RRC_IDLE, the MME initiates the paging procedure by sending PAGING message to each eNB with cells belonging to the tracking area(s) in which the UE is registered over the S1 interface using the SI application protocol (S1AP). Paging requests are sent to the relevant eNBs according to the mobility information kept in the UE's MME context in the serving MME. At steps 211, 212 and 213, MME 205 sends paging requests to eNBs 204, 203 and 202, respectively. The paging response back to the MME is initiated on NAS layer and is sent by the eNBs based on NAS-level routing information. Upon receiving the paging message from the MME, the eNB belonging to the tracking area indicated in the S1AP paging message performs paging of the UE over the radio interface by sending paging message on the cells. For UEs requiring CE, such as UE 201, paging-related information transmission over physical channels (PDSCH and possibly PDCCH) may need repetitions across multiple subframes. At steps 231 to 233, eNBs 204, 203, and 202 send paging messages to UE 201 with repetitions, respectively.

In order to save the radio resources of paging with repetitions, which occurs in the whole tracking area, smaller geographic area than the tracking area is defined in the embodiments of this invention. If the UEs requiring CE are largely stationary, it is assumed that those UEs stay in the area in a relatively long period of time. Also for the machine type communication (MTC) UE with low mobility status or stationary, such assumption is also applicable. A geographic area called paging area is used for paging the UEs requiring CE with low mobility status or being stationary. The paging area is covered by one or more eNBs, which are in the neighborhood and communicated with each other through X2 interface. Although the paging message is generated from MME, who pages the UE in all the cells of the tracking area, only the cells belonging to the paging area where the UE requiring CE is present needs to transmit the paging message with repetitions for coverage enhancement. For example, eNBs 202 and 204 form the paging area and UE 201 resides in the paging area. In one novel aspect, only eNBs 202 and 204 pages UE 201 with the same repetition number or a different repetition number. eNB 203 upon receiving the paging request from MME 205, pages UE 201 without repetition. In one embodiment, the same number of paging repetitions is applied in all the cells belonging to the paging area for one specific UE requiring CE. The repetition number is determined at least based on the coverage status of the paged UE.

Figure 3:
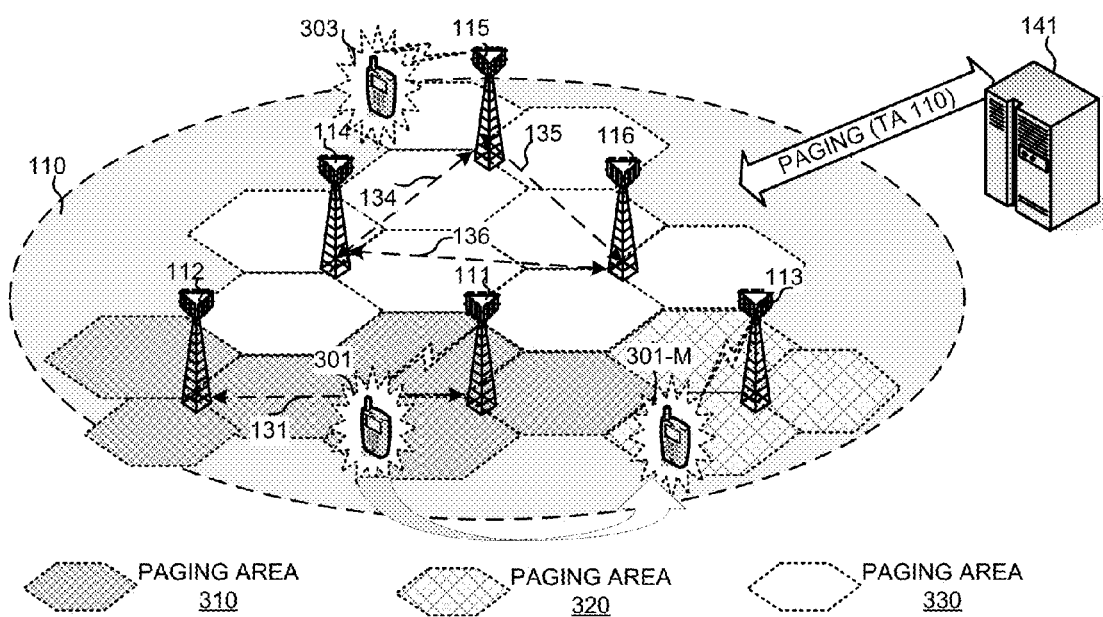
FIG. 3 illustrates a wireless communication system with each paging area organized with one or more than one eNBs in accordance with embodiments of the invention.

FIG. 3 illustrates a wireless communication system with each paging area organized with one or more than one eNBs in accordance with embodiments of the invention. A tracking area 110 served by MME 141 as shown in FIG. 3, the same as shown in FIG. 1, includes eNBs 111 to 116, each covers a geographical area. In one novel aspect, multiple paging areas are formed each includes a subset of eNBs in the tracking area. For example, eNBs 111 and 112 provide coverage distributed over a geographical region, which is paging area 310. eNB 113 forms a paging area 320. eNBs 114, 115 and 116 provide coverage distributed over a geographical region, which is paging area 330. The paging area 310 is formed through the coordination between eNB 111 and eNB 112 over X2 interface 131. The paging area 330 is formed through the coordination between eNBs 114, 115, and 116 over X2 interface 134, 135, and 136.

Since the paging area is covered by a group of cells, it can be identified by a cell lists. For E-UTRAN, each entry of the cell lists corresponds to the E-UTRAN Cell Global Identifier (ECGI) and Physical Cell Identifier (PCI) of the cell. Alternatively, the paging area can be identified by a paging area identity. For example, different paging area will have a different identity, which can be identified uniquely over a wide area. In order to make the UEs requiring CE know which paging area the cell where it camps on, the paging-area related information, such as cell lists or paging area identity, needs to be broadcast in the system information. Each eNB can contain cells belonging to different paging areas, whereas each cell can only belong to one paging area.

The paging area information is derived through coordination between the neighboring eNBs under the management of the MME. The paging area is identified by an identity or a neighboring cell list. eNBs which provide coverage to the same paging area should have the same paging area identity or the same neighboring cell list. The paging area information is broadcast by eNBs.

eNBs in the paging area consider the UE is a new comer if no UE information for the UE requiring CE has been stored by them. UE 301 in idle mode camps on the cell of eNB 111 for the first time. In this case, if the CE indication from UE 301 is received, eNB 111 shares this information with eNB 112 in the same paging area. Since each eNBs shares the UE information with the neighboring eNBs, the UE information for a specific UE requiring CE is kept by all the eNBs in the paging area, even if the RRC connection of the UE is released. The UE information for the UE requiring CE, which is shared by the eNBs in the paging area, includes UE identity as well as the CE status. When UE 301 moves to a new location served by eNB 113, denoted by UE 301-M, the UE notifies eNB 113 of its presence upon detecting different paging area through the broadcasted system information. Similarly, eNB 113 would share information of UE 301-M with eNBs in the same paging area. In this example, there is no other eNBs in the same paging area as eNB 113.

Figure 4:
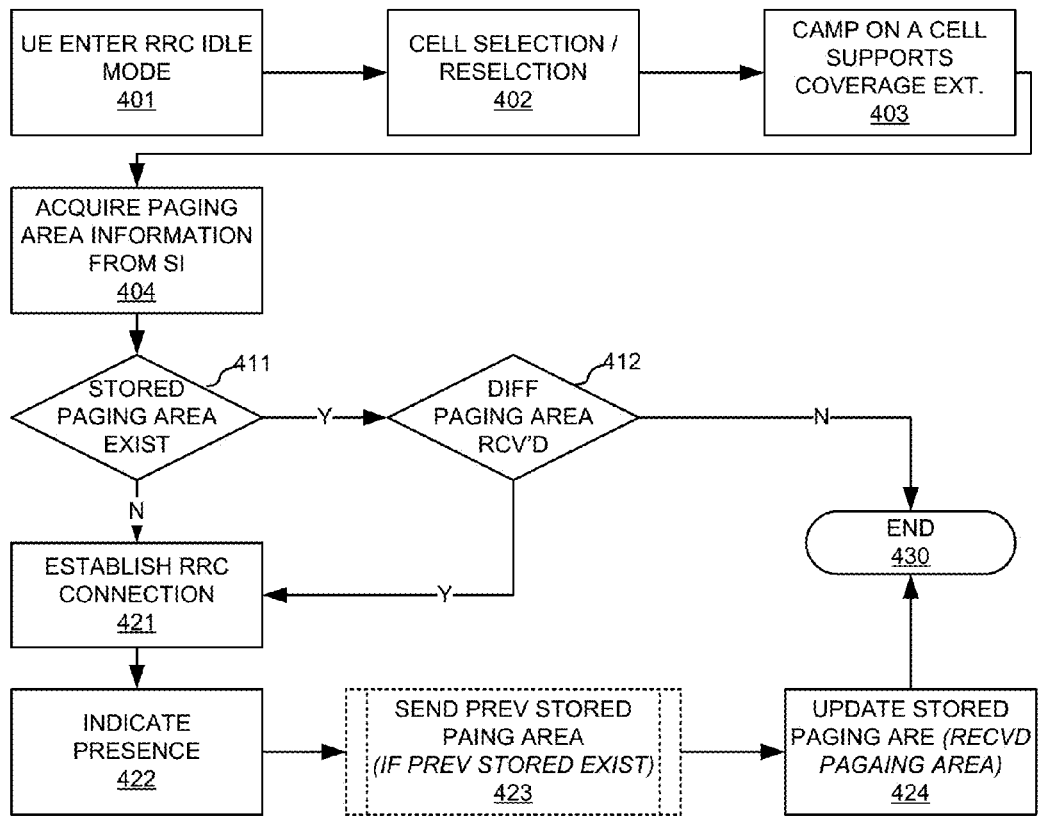
FIG. 4 illustrates an exemplary flow chart of for the UE to indicate to eNB its presence in the paging area in accordance with embodiments of the current invention.

FIG. 4 illustrates an exemplary flow chart of for the UE to indicate to eNB its presence in the paging area in accordance with embodiments of the current invention. At step 401, the UE enters RRC_IDLE mode. Subsequently, at step 401, the UE performs cell selection or reselection to find a cell to camp on. In one embodiment, if UE determines that it requires CE, the UE determines if the cell it detects supports CE. In one embodiment, the UE prefers cells that support CE. In another embodiment, the UE only selects cells that support CE. At step 403, the UE camps on a cell that supports CE. At step 404, the UE acquires the paging area information from the system information. At step 411, the UE checks a stored paging area information exists. If UE has not stored any paging area information, i.e. there is no current value for the paging area, the UE moves to step 421. At step 421, the UE establishes RRC connection with the network. Subsequently, at step 422, the UE indicates its presence in the paging area to the network. Then the corresponding information of the paging area e.g. paging area identity or the neighboring cell list is stored by the UE at step 424. If at step 411, the UE determines that there is paging area information stored, it moves to step 412. At step 412, the UE determines that the received paging area is different from the stored paging area. If step 412 determines that there is no difference in the paging area, the UE moves to step 430 and ends the paging area updating procedure, and in one case, to establish a RRC connection with the original network as usual (not shown). If step 412 determines that there exists any difference between the received paging area and the stored paging area, the UE moves to step 421 and establishes a RRC connection with the network. When UE performs cell selection/reselection and camps on another cell, UE checks whether it moves into a different paging area. If UE moves to a different paging area, it establishes a RRC connection with the network and indicates its presence in the new paging area to the network. Subsequently, at step 422, the UE indicates its presence in the paging area to the network. In one embodiment, the UE optionally sends its previously stored paging area information to the new base station (step 423). In another embodiment, the corresponding information of the paging area e.g. paging area identity or the neighboring cell list is updated by the UE at step 424. Even if the RRC connection with the network is released, both the UE and the base stations keep the paging area information. The UE in RRC_IDLE can check whether it moves to a different paging area due to IDLE mode mobility by acquiring paging area information.

The CE status of the UE changes with UE mobility or due to other factors such as environmental changes. In one embodiment, the CE status indicates only CE-UE or non-CE-UE. In another embodiment, different levels for a CE status are used. In either cases, the UE monitors its CE status, updates CE changes to the network accordingly.

Figure 5:
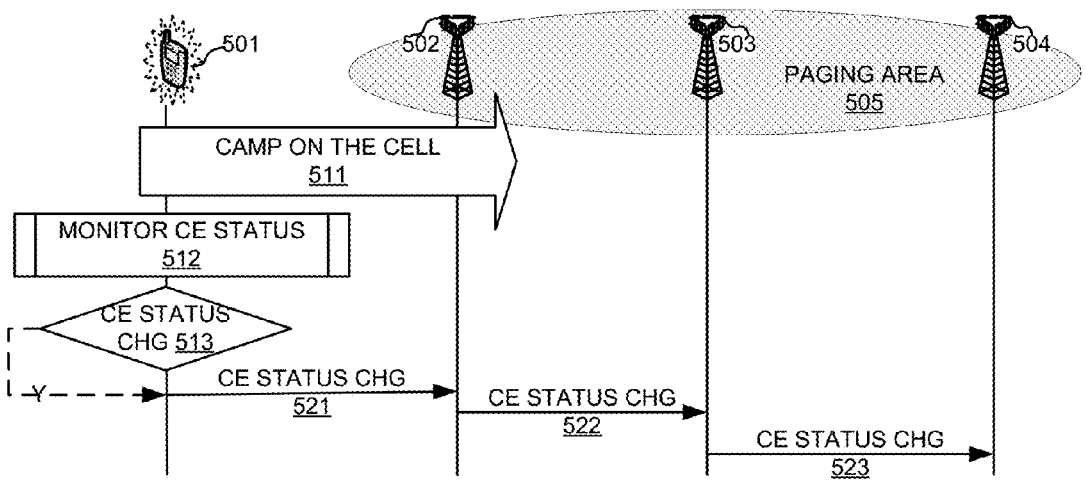
FIG. 5 illustrates an exemplary flow chart for a UE to indicate to eNB the change of the CE status in the paging area in accordance with embodiments of the current invention.

FIG. 5 illustrates an exemplary flow chart for a UE to indicate to eNB the change of the CE status in the paging area in accordance with embodiments of the current invention. At step 511, a UE 501 camps on a cell served by an eNB 502. eNB 502, together with eNBs 503 and 504, form a paging area 505. UE 501 monitors the CE status at step 512. At step 513, upon detecting change of the coverage status of the UE, UE 501 updates its coverage status to the network. If UE 501 is in RRC_CONNECTED, UE 501 reports its coverage status directly. Otherwise, UE 501 establishes a RRC connection with the network for the purpose of coverage status update. In one embodiment, at step 521, UE 501 sends CE status change indication to eNB 502. Upon receiving the CE status change indication from UE 501, eNB 502 updates the information with its neighboring eNBs in the same paging area 505. At step 522, eNB 502 sends CE status change indication of UE 501 to eNB 503. At step 523, eNB 502 sends CE status change indication of UE 501 to eNB 504. The above steps 522 and 523 perform either in parallel or in sequence. In another embodiment, UE 501 reports its CE status periodically to the eNB. In one embodiment, such periodic report can be aligned with other UE periodic reports.

Figure 6:
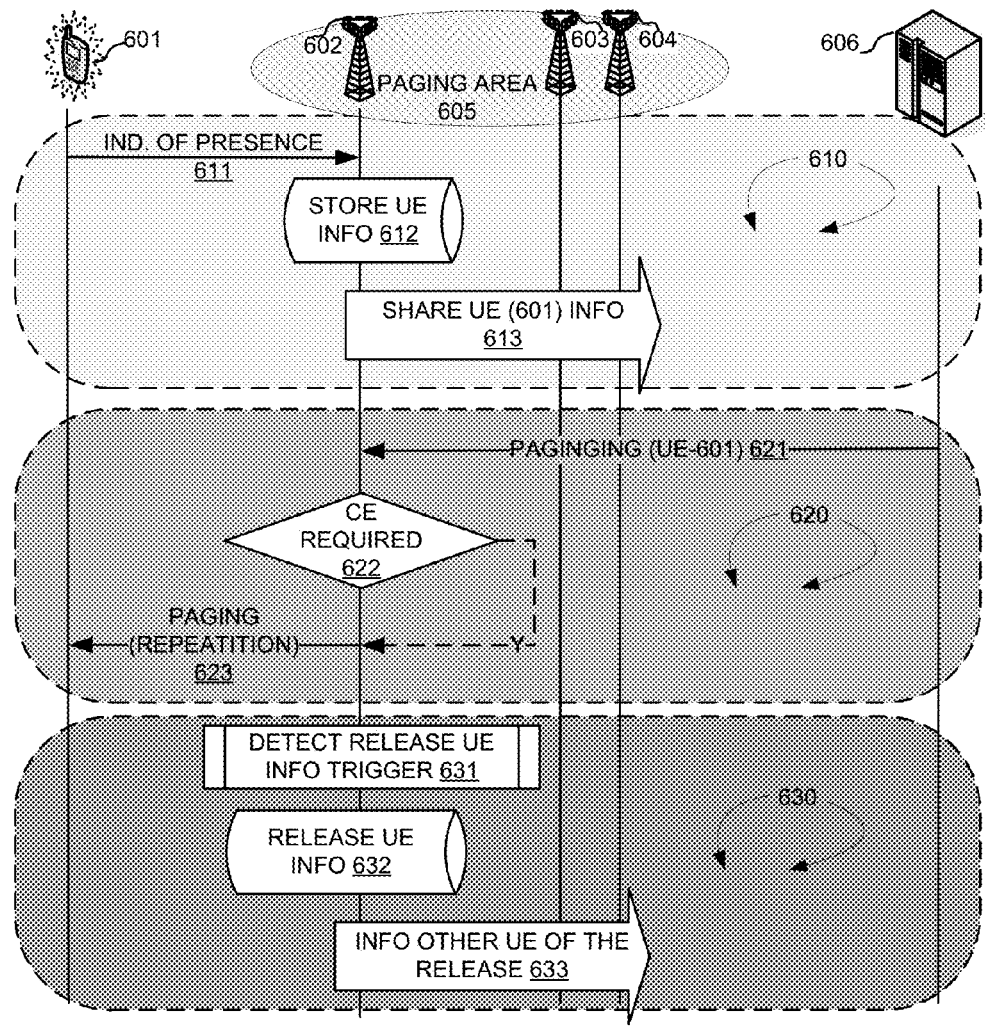
FIG. 6 illustrates an exemplary system level flow chart of the UE, the eNB and the MME for the paging procedure for UEs requiring CE in accordance with embodiments of the current invention.

FIG. 6 illustrates an exemplary system level flow chart of the UE, the eNB and the MME for the paging procedure for UEs requiring CE in accordance with embodiments of the current invention. A UE 601 camps on an eNB 602. UE 601 requires CE. A paging area 605 includes eNBs 602, 603 and 604. eNBs 602, 603 and 604 communicates with an MME 606. FIG. 6 includes a paging-area update procedure 610 including steps 611 to 613, a paging procedure 620 including steps 621 to 623, and a releasing procedure 630 including steps 631 to 633.

At step 611, UE 601 indicates its presence, with CE status, to eNB 602. eNB 602 stores UE 601 information to its CE UE list at step 612. eNB 602 shares UE 601 information with eNB 603 and 604 in the same paging area 605 at step 613.

At step 621, MME 606 sends paging request for UE 601 to all eNBs in the tracking area. At step 622, eNB 602 checks if UE 601 requires CE. If yes in step 622, at step 623, eNB 602 pages UE 601 repeatedly by a repetition number. If no, eNB 602 pages UE 601 normally. Similarly, eNBs 603 and 604 in paging area 605 page UE 601 repeatedly by the repetition number because they determine that UE 601 requires CE. Or else eNBs 603 and 604 in paging area 605 page UE 601 normally, i.e. without repetition.

The UE information for the specific UE requiring CE may be released by the eNBs belonging to the paging area under certain conditions, such as the coverage status of the UE becomes better and changes to normal mode, or the UE requiring CE is not successfully paged in a pre-defined number of tries, or eNBs in another paging area informs that the UE is out of the original paging area. At step 631, eNB 602 detects one or more release UE information triggers/conditions for UE 601. At step 632, eNB 602 releases UE 601 from its CE UE list. At step 633, eNB 602 informs eNBs 603 and 604 of the releasing of UE 601.

Figure 7:
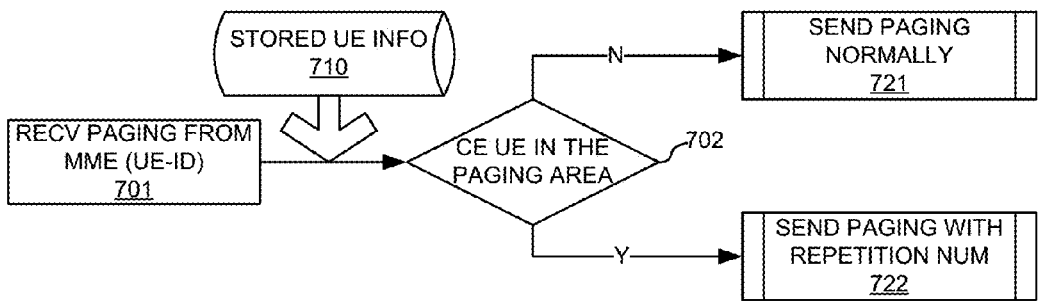
FIG. 7 illustrates an exemplary flow chart for the eNB to page the UE requiring CE in accordance with embodiments of the current invention.

In one novel aspect, the enhancement for the paging procedure for CE UEs requires no changes at the MME level. The eNBs keeps track of UEs requiring CE and pages UEs differently based on their CE status. FIG. 7 illustrates an exemplary flow chart for the eNB to page the UE requiring CE in accordance with embodiments of the current invention. At step 701, the eNB receives paging request from the MME. The eNB, at step 710, the eNB checks the stored UE information based on the paged UE ID. At step 702, the eNB checks if the paged UE is a UE requiring CE, i.e., if the paged UE is a CE UE in the paging area. If step 702 determines no, the eNB pages the UE normally without repetition. If step 702 determines yes, the eNB pages the UE repeatedly by a repetition number.

Figure 8:
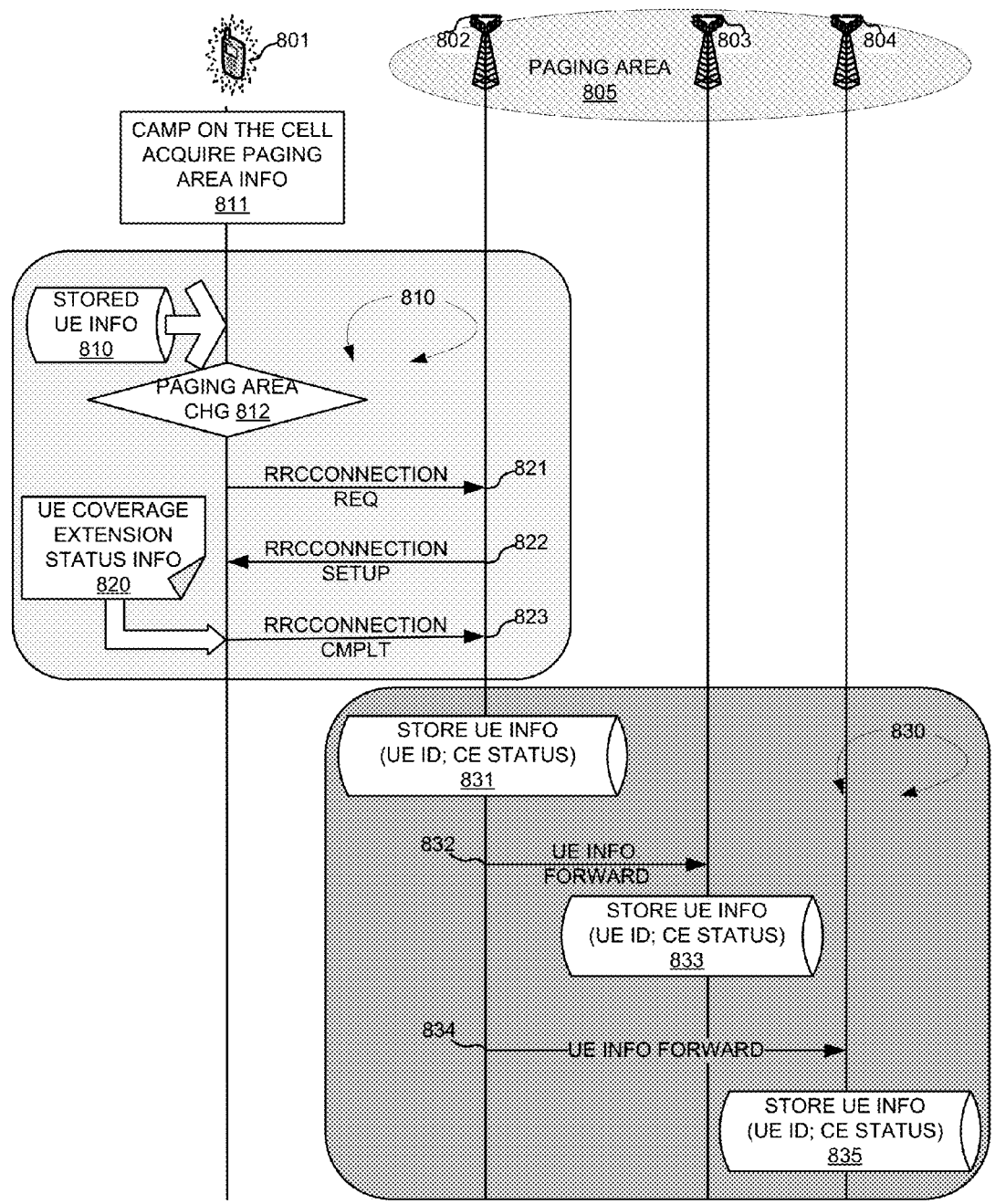
FIG. 8 illustrates an exemplary flow diagram detailing procedures for eNBs in a paging area to store or update information of UEs requiring CE in accordance with embodiments of the current invention.

FIG. 8 illustrates an exemplary flow diagram detailing procedures for eNBs in a paging area to store or update information of UEs requiring CE in accordance with embodiments of the current invention. FIG. 8 includes a UE procedure 810 and an eNB procedure 830. UE 801 requires CE. At step 811, UE 801 camps on eNB 802 and acquires the paging area information. eNB 802, together with eNBs 803 and 804 form a paging area 805. At step 810, UE 801 checks stored coverage area information. At step 812, UE 801 determines if there is paging area changes between the receiving paging area from eNB 802 and the stored paging area information. UE 801 determines a paging area change if there was no previous stored paging area information or the received paging area is different from the stored paging area. Upon detecting paging area changes, UE 801 moves to step 821 and sends an RRCConnection Request message to eNB 802. At step 822, UE 802 receives an RRCConnection Setup message from eNB 802. At step 823, UE 801 sends an RRCConnection Complete message to eNB 802. In one embodiment, UE 801 includes the CE status indication or information in the RRCConnectionComplete or RRCConnectionRequest message. In another embodiment, the UE establishes a RRC connection with establishment cause indicating a "paging area change." At step 831, eNB 802 upon receiving CE status information in the RRCConnectionComplete or RRCConnectionRequest message, stores the UE information in its CE UE list. In one embodiment, the UE information includes the UE ID and the CE status. At step 832, eNB 802 forwards the UE information to eNB 803. At step 833, eNB 803 stores the UE information in its CE UE list. At step 834, eNB 802 forwards the UE information to eNB 804. At step 835, UE 804 stores the UE information in its CE UE list.

Figure 9:
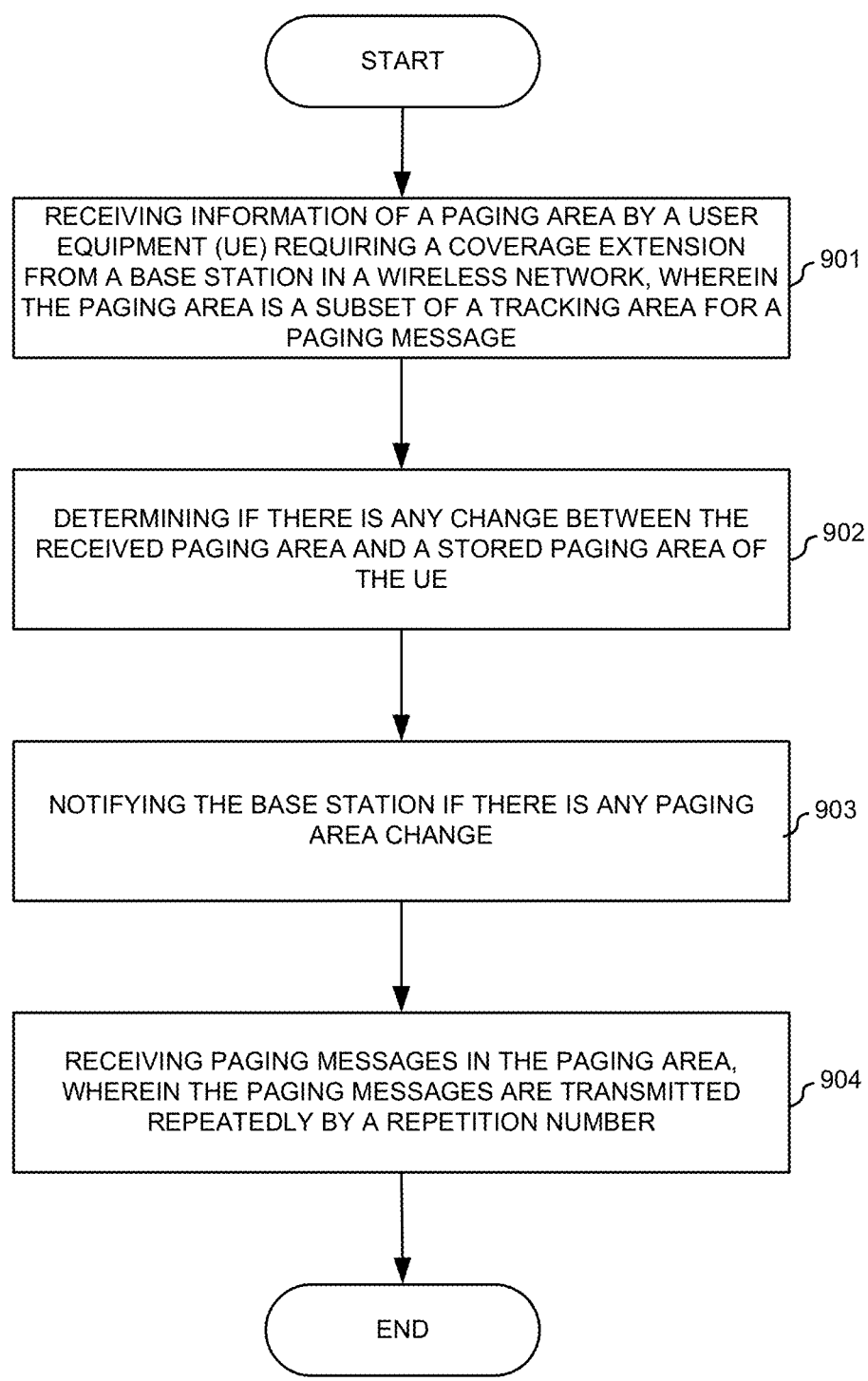
FIG. 9 shows an exemplary flow chart for the UE procedure of paging area handling when in the CE mode in accordance with embodiments of the current inventions.

FIG. 9 shows an exemplary flow chart for the UE procedure of paging area handling when in the CE mode in accordance with embodiments of the current inventions. At step 901, the UE requiring a CE receives information of a paging area from a base station in a wireless network, wherein the paging area is a subset of a tracking area for. At step 902, the UE determines if there is any change between the received paging area and a stored paging area of the UE. At step 903, the UE notifies the base station if there is any paging area change. At step 904, the UE receives paging messages in the paging area, wherein the paging messages are transmitted repeatedly by a repetition number.

Figure 10:
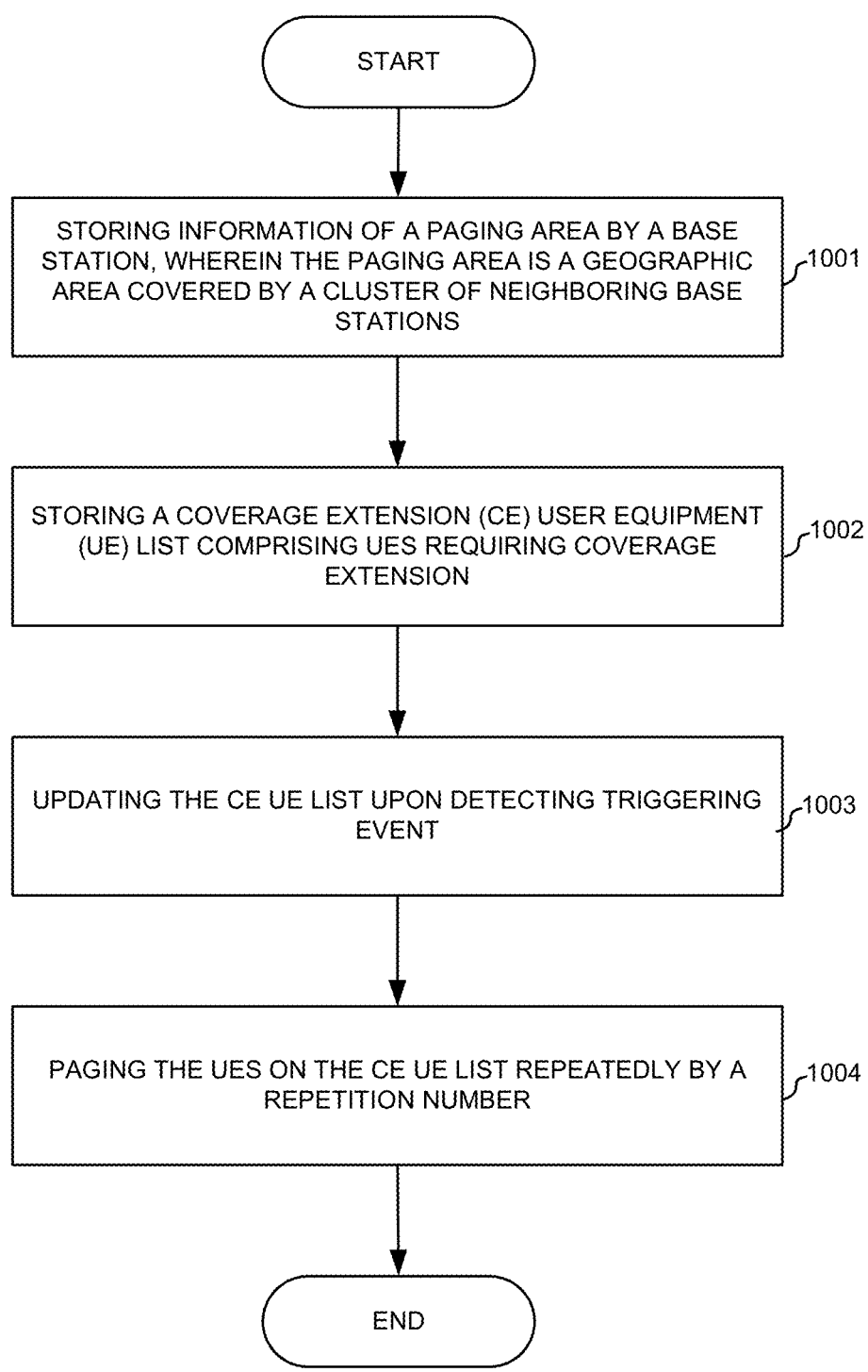
FIG. 10 shows an exemplary flow chart for the base station procedure of paging area handling when in the CE mode in accordance with embodiments of the current inventions.

FIG. 10 shows an exemplary flow chart for the base station procedure of paging area handling when in the CE mode in accordance with embodiments of the current inventions. At step 1001, the base station stores information of a paging area, wherein the paging area is a geographic area covered by a cluster of neighboring base stations. At step 1002, the base station stores a CE (CE) UE list comprising UEs requiring CE. At step 1003, the base station updates the CE UE list upon detecting triggering event. At step 1004, the base station pages the UEs on the CE UE list repeatedly by a repetition number.

Using paging area solutions, the wireless network can page the UEs in CE mode efficiently. Such solution requires system level modifications and additional signaling procedures. Another possible solution is to require the UE to report the CE status to the network entity, such as the MME through eNB. When the MME needs to page the UE, it will inform all the eNBs in the corresponding tracking area to page the UE with repetitions. This simplified solution, though less efficient, would require less signaling.

Figure 11:
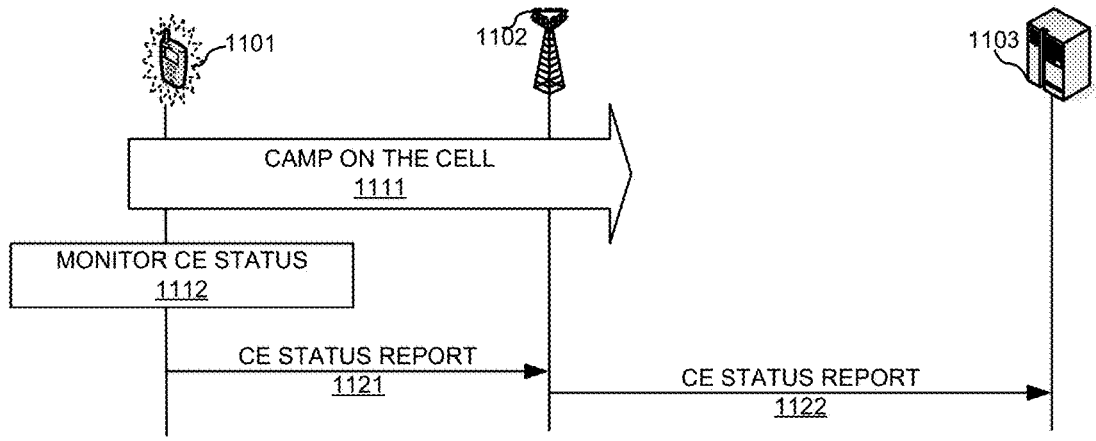
FIG. 11 illustrates an exemplary diagram of a UE in the CE mode reporting its CE status to the network in accordance with embodiments of the current invention.

FIG. 11 illustrates an exemplary diagram of a UE in the CE mode reporting its CE status to the network in accordance with embodiments of the current invention. At step 1111, a UE 1101 camps on a cell served by an eNB 1102. eNB 1102 communicates with a network control entity, such as an MME 1103. UE 1101 monitors the CE status at step 1112. In one embodiment, UE 1101 determines its being in the CE mode if the UE is a low cost UE. UE 1101 also determines its being in the CE mode if the normal UE requires CE. At step 1121, the UE upon detecting CE mode, sends the CE status report to eNB 1102. If UE 1101 is in RRC_CONNECTED, UE 1101 reports its coverage status directly. Otherwise, UE 1101 establishes a RRC connection with the network for the purpose of coverage status report. Upon receiving the CE status report from UE 1101, eNB 1102 sends the CE status report to MME 1103. In one embodiment, UE 1101 reports its CE status upon entering a new tracking area. In one embodiment, the CE status report from the UE includes a CE status of the UE and a corresponding cell ID for the UE. The eNB relays the UE CE status report directly to the MME. In another embodiment, the CE status report from the UE includes the CE status of the UE only. The eNB adds corresponding cell information in its CE status report and sends the CE status of the UE and the corresponding cell ID for the UE to MME.

Figure 12:
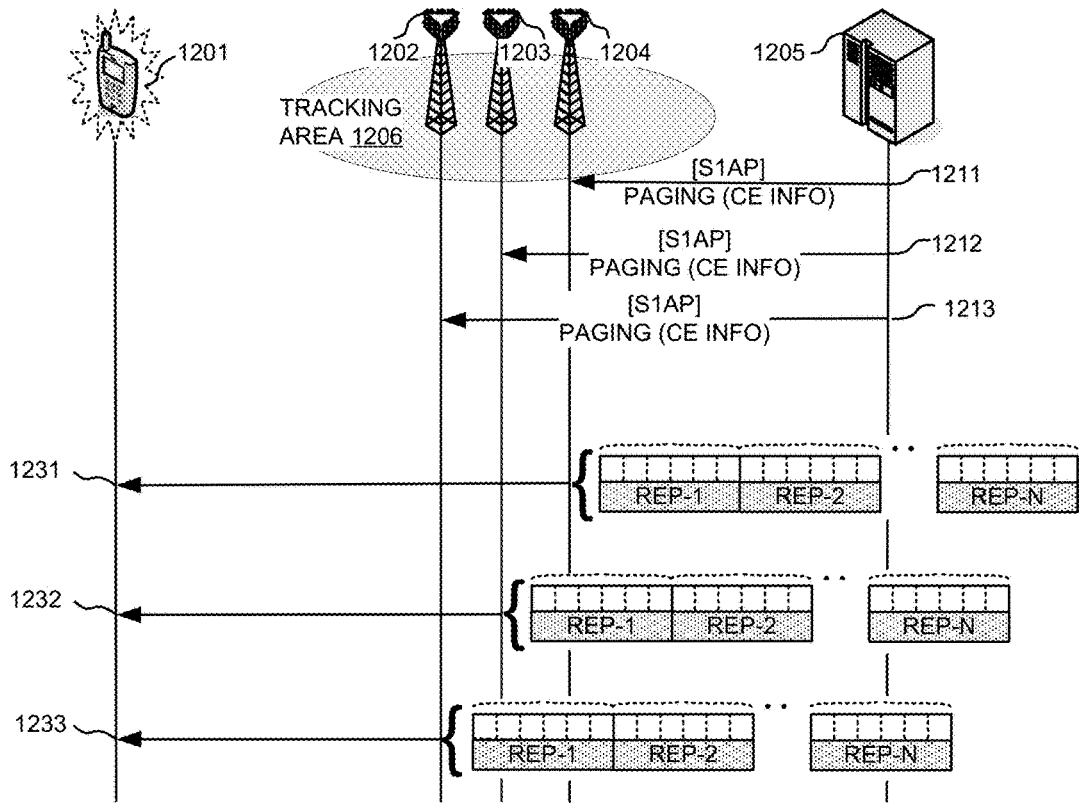
FIG. 12 illustrates an exemplary paging procedure that the MME informs the eNBs with CE status such that the paging message to the UE is sent repeatedly in accordance with embodiments of the current invention.

FIG. 12 illustrates an exemplary paging procedure that the MME informs the eNBs with CE status such that the paging message to the UE is sent repeatedly in accordance with embodiments of the current invention. UE 1201 requires CE. UE 1201 in idle mode resides in a tracking area 1206 served by eNBs 1202, 1203, and 1204, which are connected with a network entity, such as MME 1205 via S1 interface. In one embodiment, MME 1205 determines the CE status of UE 1201. Upon detecting that UE 1201 requires CE, MME 1205 sends information to all base stations in tracking area 1206. At steps 1211, 1212 and 1213, MME 205 sends paging requests to eNBs 1204, 1203 and 1202, respectively. The paging response back to the MME is initiated on NAS layer and is sent by the eNBs based on NAS-level routing information. Upon receiving the paging message from the MME, the eNB belonging to the tracking area indicated in the S1AP paging message performs paging of the UE over the radio interface by sending paging message on the cells repeatedly. In one embodiment, upon detecting CE information in the S1AP paging message indicating CE is required for the paged UE, the base stations in tracking area 1206 send page messages to UE 1201 repeatedly by a repetition. eNBs 1204, 1203 and 1202 send paging messages to UE 1201 repeatedly at steps 1231, 1232 and 1233, respectively. In one embodiment, the repetition number is provided to the base stations by the MME.

Figure 13:
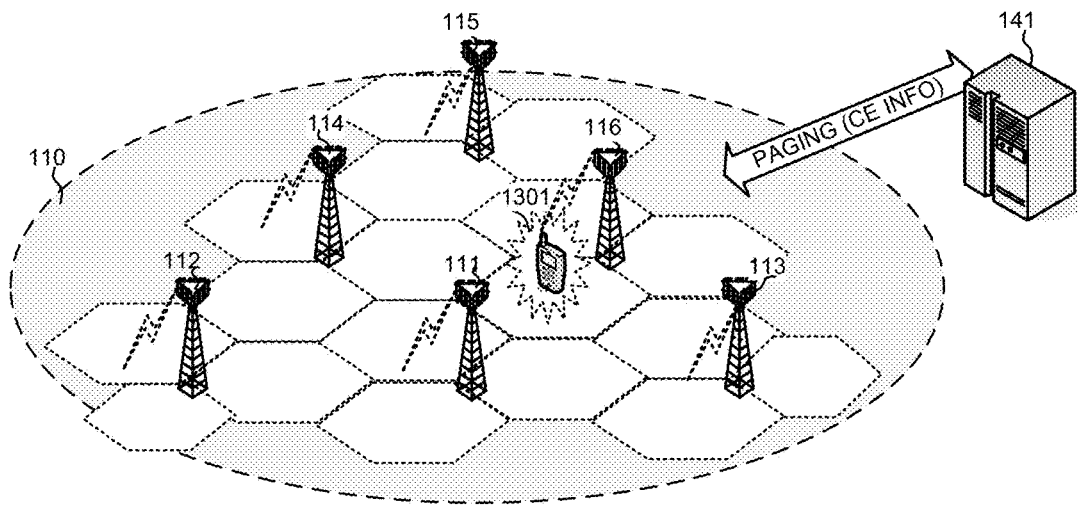
FIG. 13 illustrates an exemplary diagram of the MME sending the CE status information to all eNBs in the tracking area such that the paging messages are sent repeatedly in accordance with embodiments of the current invention.

FIG. 13 illustrates an exemplary diagram of the MME sending the CE status information to all eNBs in the tracking area such that the paging messages are sent repeatedly in accordance with embodiments of the current invention. A tracking area 110 served by MME 141, as shown in FIG. 1, includes eNBs 111 to 116, each covers a geographical area. A UE 1301, requiring CE, camps on eNB 116. MME 141 acquires the CE status of UE 1301. In one embodiment, MME 141 stores CE status information of UE 1301. Upon a mobile terminating call being initiated to UE 1301, MME 141 sends paging requests to all eNBs in tracking area 110. In one novel aspect, MME 141 sends the paging request to all base stations in tracking area 110 and indicates CE information of the paged UE. Upon receiving the paging request with CE information from MME 141, eNBs 111 to 116 pages UE 1301 repeatedly by a repetition number. In one embodiment, the repetition number is provided by MME 141. In one embodiment, the repetition number is included in the paging request message. In another embodiment, the eNBs derives its own repetition number based on the information from the MME. In yet another embodiment, the repetition number is based on the CE status.

Figure 14:
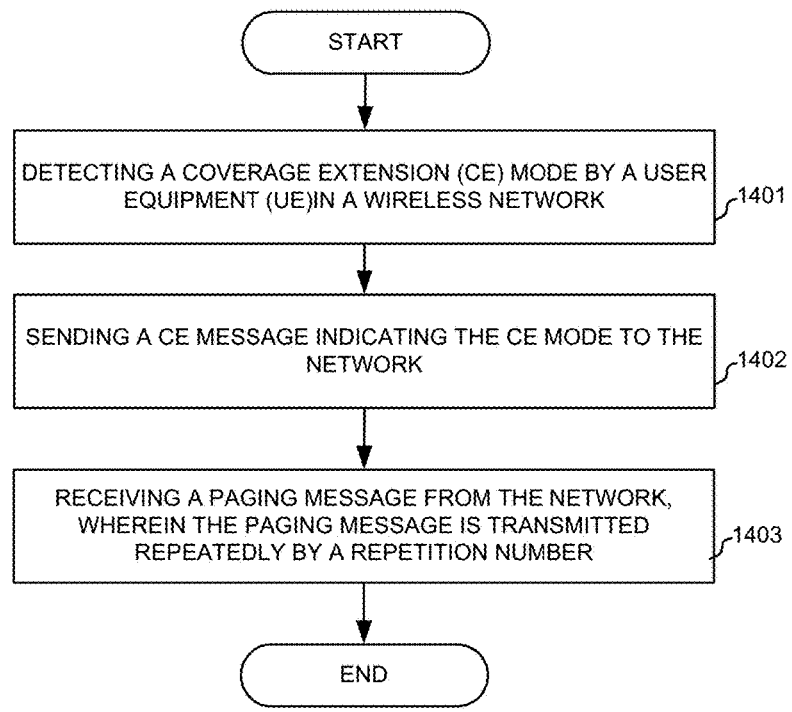
FIG. 14 illustrates an exemplary flow chart of the UE requiring CE reporting its CE status to the network in accordance with embodiments of the current invention.

FIG. 14 illustrates an exemplary flow chart of the UE requiring CE reporting its CE status to the network in accordance with embodiments of the current invention. At step 1401, the UE detects a CE mode in a wireless network. At step 1402, the UE sends a CE report indicating the CE mode to the network. At step 1403, the UE receives a paging message from the network, wherein the paging message is transmitted repeatedly by a repetition number.

Figure 15:
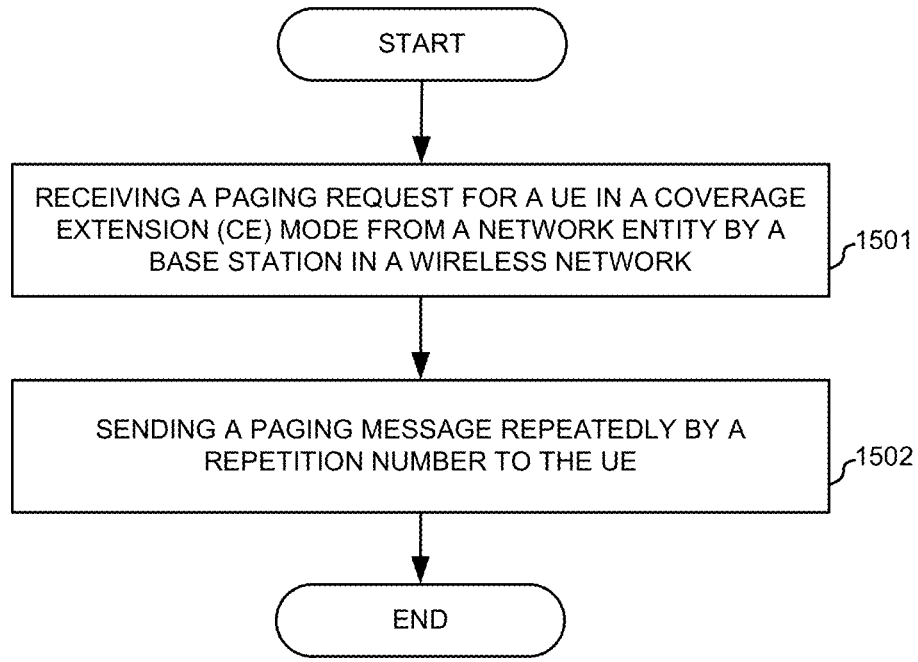
FIG. 15 illustrates of an exemplary flow chart of the eNB paging the UE requiring CE in accordance with embodiments of the current invention.

FIG. 15 illustrates of an exemplary flow chart of the eNB paging the UE requiring CE in accordance with embodiments of the current invention. At step 1501, the base station receives a paging request for a UE in a CE mode from a network entity in a wireless network. At step 1502, the base station sends a paging message repeatedly by a repetition number to the UE.

Figure 16:
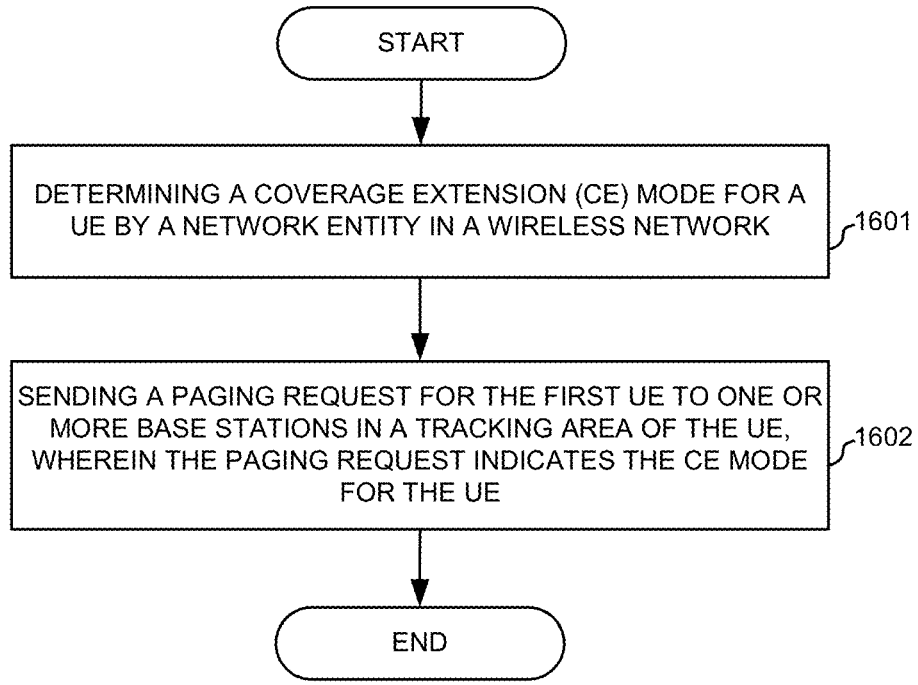
FIG. 16 illustrates of an exemplary flow chart of the MME sending UE CE status to the base stations in the tracking area in accordance with embodiments of the current invention.

FIG. 16 illustrates of an exemplary flow chart of the MME sending UE CE status to the base stations in the tracking area in accordance with embodiments of the current invention. At step 1601, the network entity determines a CE mode for a UE in a wireless network. At step 1602, the network entity sends a paging request for the UE to one or more base stations in a tracking area of the UE, wherein the paging request indicates the CE mode for the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving information of a paging area by a user equipment (UE) requiring a coverage extension/coverage enhancement (CE) from a base station in a wireless network, wherein the paging area is a subset of a tracking area covered by a subset of one or more base stations or cells which are closest to the UE;
   determining if there is one or more changes between the received paging area and a stored paging area of the UE;
   notifying the base station if there is one or more paging area changes; and
   receiving paging messages in the paging area, wherein each paging messages for the UE is transmitted repeatedly by a repetition number greater than one.

2. The method of claim 1, wherein the notifying the base station involves:
   establishing a radio resource control (RRC) connection with the base station; and
   reporting a CE status of the UE to the base station.

3. The method of claim 2, wherein an establishment cause IE of a RRC Connection Request for the RRC connection establishment indicating a paging area change.

4. The method of claim 2 further comprising:
   reporting the stored paging area information to the base station.

5. The method of claim 1 further comprising:
   updating the stored paging area if there is paging area change.

6. The method of claim 1 further comprising:
   reporting the stored paging area information to the wireless network periodically.

7. The method of claim 1 further comprising:
   detecting a CE status change; and
   reporting the CE status change to the wireless network.

8. A method comprising:
   storing information of a paging area by a base station, wherein the paging area is a geographic area covered by a cluster of neighboring base station, and wherein the paging area is a subset of a tracking area covered by a subset of one or more base stations or cells which are closest to one or more corresponding UEs;
   storing a coverage extension/coverage enhancement (CE) user equipment (UE) list comprising UEs requiring CE, wherein repetition transmission for each transmission is used for UEs requiring CE;
   updating the CE UE list upon detecting triggering event; and
   paging the UEs on the CE UE list repeatedly by a repetition number greater than one.

9. The method of claim 8, wherein the paging area is derived by coordinating among neighboring base stations identified by a base station ID or a neighboring cell list.

10. The method of claim 8 further comprising: broadcasting the information of the paging area in a system information message.

11. The method claim 8 wherein the triggering event is receiving a notification of presence by a UE requiring CE.

12. The method of claim 11 wherein the notification of presence includes a CE status of the UE.

13. The method of claim 11 further comprising: establishing a radio resource control (RRC) connection with the UE, and wherein an establishment cause IE in a RRC Connection Request message for the RRC establishment indicates a paging area change.

14. The method of claim 11 further comprising: forwarding the UE notification of presence information to the base stations in the paging area.

15. The method of claim 8, wherein the triggering event is receiving a notification of CE UE presence from a neighboring base station.

16. The method of claim 8 further comprising: deleting one or more UEs from the CE UE list upon detecting one or more releasing events.

17. The method of claim 16 wherein the release events comprising: failure to receive a paging response from the UE after repeatedly tries by the repetition number, failure to receive a paging response after a period of time, or receiving a notification from a neighboring base station indicating the UE is out of the paging area.

18. A user equipment (UE) comprising
a transceiver that transmits and receives radio signals via a first radio access link;
an information storage circuit that stores information of a stored paging area;
a paging area tracker circuit that receives information of a paging area from a base station when the UE requires coverage extension/coverage enhancement (CE), wherein the paging area is covered by a subset of one or more base stations or cells which are closest to the UE, determines if there is one or more changes between the paging area and the stored paging area of the UE, and notifies the base station if there is one or more paging area changes; and
a pager circuit that receives and processes paging messages in the paging area, wherein the page messages are transmitted repeatedly by a repetition number greater than one.

19. The UE of claim 18, wherein the paging area tracker circuit establishes a radio resource control (RRC) connection with the base station and reports a CE status of the UE to the base station.

20. The UE claim 19, wherein an establishment cause IE of a RRC Connection Request for the RRC connection establishment indicates a paging area change.

21. The UE of claim 19, wherein the paging area tracker circuit further reports the stored paging area information to the wireless network.

22. The UE of claim 18, wherein the information storage circuit updates the stored paging area if there is paging area change.

23. The UE of claim 18, wherein the paging area tracker circuit reports the stored paging area information to the wireless network periodically.

24. The UE of claim 18, wherein the paging area tracker circuit reports CE status to the wireless network upon detecting a CE status change.

* * * * *